United States Patent
Tomioka (10) Patent No.: US 10,367,964 B2
(45) Date of Patent: Jul. 30, 2019

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroyuki Tomioka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/936,826

(22) Filed: Mar. 27, 2018

(65) Prior Publication Data

US 2018/0288267 A1 Oct. 4, 2018

(30) Foreign Application Priority Data

Mar. 28, 2017 (JP) ................. 2017-063770

(51) Int. Cl.
| | | |
|---|---|---|
| *G06T 5/00* | (2006.01) | |
| *H04N 1/407* | (2006.01) | |
| *H04N 1/10* | (2006.01) | |
| *H04N 1/00* | (2006.01) | |
| *H04N 1/028* | (2006.01) | |

(52) U.S. Cl.
CPC ........... *H04N 1/103* (2013.01); *H04N 1/0079* (2013.01); *H04N 1/00909* (2013.01); *H04N 1/02815* (2013.01)

(58) Field of Classification Search
CPC .. H04N 1/103; H04N 1/0079; H04N 1/00909; H04N 1/02815

See application file for complete search history.

(56) References Cited

U.S. PATENT DOCUMENTS

| | | | | |
|---|---|---|---|---|
| 2002/0134622 A1* | 9/2002 | Michioka | ........... | B23Q 11/0875 184/5 |
| 2009/0148173 A1* | 6/2009 | Tajima | ............... | G03G 15/0258 399/36 |
| 2014/0112676 A1* | 4/2014 | Mori | ................ | G03G 15/04045 399/49 |
| 2014/0119768 A1* | 5/2014 | Yuki | .................. | G03G 21/1666 399/98 |
| 2014/0334840 A1* | 11/2014 | Mizuno | .................... | F16H 55/17 399/98 |
| 2014/0348529 A1* | 11/2014 | Takahashi | ........ | G03G 15/04036 399/71 |
| 2015/0002914 A1* | 1/2015 | Takahashi | ............... | F16H 25/12 358/484 |

FOREIGN PATENT DOCUMENTS

JP 2010-91690 4/2010

* cited by examiner

*Primary Examiner* — Moustapha Diaby
(74) *Attorney, Agent, or Firm* — Wenderoth, Lind & Ponack, L.L.P.

(57) ABSTRACT

An image forming apparatus includes a housing. From an upper surface of the housing, a plate-like rail part, which extends along the screw shaft to guide movement of the holding member, protrudes, and the holding member is provided with a guide part having a guide groove engaged with the rail part. The optical scanning device further includes a scraper member fixed to the holding member and scraping off foreign matters attached to the rail part, wherein the scraper member includes a pair of scraper pieces provided at both sides of the rail part while interposing the rail part therebetween and having distal end edges abutting a side surface of the rail part.

8 Claims, 11 Drawing Sheets

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2017-063770 filed on Mar. 28, 2017, the entire contents of which are incorporated herein by reference.

BACKGROUND

The technology of the present disclosure relates to an optical scanning device and an image forming apparatus including the same.

An image forming apparatus employing an electrophotographic system such as a copy machine and a printer includes an optical scanning device that emits light for forming an electrostatic latent image on a photoreceptor.

The optical scanning device has a housing that receives a polygon mirror, an image forming lens and the like. The housing is formed with light emitting ports that emit light. The light emitting port includes an opening extending in a predetermined direction. The light emitting port is closed by a transparent cover such as a dustproof glass.

However, when dirt, dust and the like due to toner and the like are attached to the surface of the transparent cover, there is a problem that the optical characteristics of the optical scanning device are deteriorated and thus image failure occurs. In this regard, there has been proposed a cleaning mechanism that regularly cleans the surface of the dustproof glass.

The cleaning mechanism has a screw shaft extending along the transparent cover, and a holding member screwed with the screw shaft to hold a cleaning member.

The holding member has a cylindrical nut part screwed with the screw shaft, and an arm part that extends from the nut part in a direction crossing the screw shaft and holds the cleaning member. The nut part is provided on the inner peripheral surface thereof with a protrusion part that engages with a spiral groove formed on the outer peripheral surface of the screw shaft. The spiral groove of the outer peripheral surface of the screw shaft and the protrusion part of the inner peripheral surface of the nut part are engaged with each other and the screw shaft is rotated, so that the holding member moves along the screw shaft. The holding member reciprocally moves along a predetermined movement path when a motor is rotated forward and backward. By so doing, the cleaning member reciprocally moves while abutting the surface of the transparent cover, so that the surface of the transparent cover is cleaned by the cleaning member.

SUMMARY

An optical scanning device according to one aspect of the present disclosure includes a housing, a transparent cover, a screw shaft, a cleaning member, and a holding member. The housing has light emitting ports. The transparent cover closes the light emitting ports. The screw shaft extends along the transparent cover and freely rotates. The cleaning member abuts a surface of the transparent cover. The holding member has a nut part screwed with the screw shaft and arm parts extending from the nut part to hold the cleaning member. The holding member reciprocally moves along a predetermined movement path by rotation of the screw shaft.

From an upper surface of the aforementioned housing, a plate-like rail part protrudes. The rail part extends along the screw shaft to guide the movement of the holding member. The holding member is provided with a guide part having a guide groove engaged with the rail part. The optical scanning device further includes a scraper member. The scraper member is fixed to the holding member and scrapes off foreign matters attached to the rail part. The scraper member includes a pair of scraper pieces provided at both sides of the rail part while interposing the rail part therebetween and having distal end edges abutting a side surface of the rail part.

DETAILED DESCRIPTION

Hereinafter, an example of an embodiment will be described in detail on the basis of the drawings. It is noted that the technology of the present disclosure is not limited to the following embodiments.

Embodiment

Figure 1:
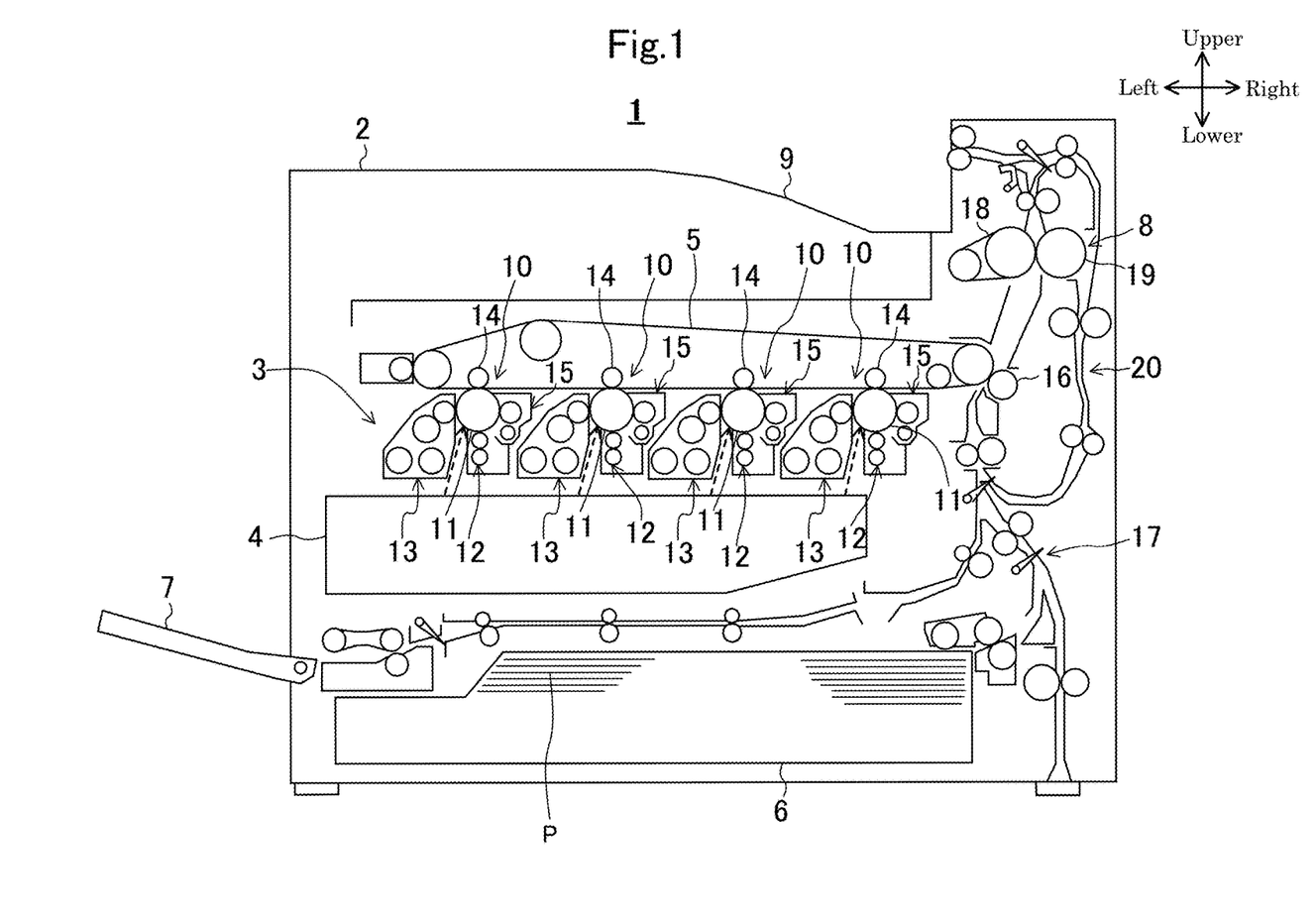
FIG. 1 is a schematic diagram illustrating an overall configuration of an image forming apparatus provided with an optical scanning device in an embodiment.

FIG. 1 illustrates a schematic configuration diagram of an image forming apparatus 1 provided with an optical scanning device 4 according to an example of an embodiment. In the following description, it is assumed that a front side and a rear side indicate a front side and a rear side (a front side and a back side in a direction vertical to the paper surface of FIG. 1) of the image forming apparatus 1, and a left side and a right side indicate a left side and a right side when the image forming apparatus 1 is viewed from the front side.

The image forming apparatus 1 is a tandem type color printer and includes an image forming unit 3 in a box-like casing 2. The image forming unit 3 transfers an image to a recording paper P and forms the image on the recording paper P on the basis of image data transmitted from an external device such as a computer subjected to network connection and the like. Below the image forming unit 3, an optical scanning device 4 is arranged to irradiate laser light, and above the image forming unit 3, a transfer belt 5 is arranged. Below the optical scanning device 4, a paper storage unit 6 is arranged to store the recording paper P, and at the left side of the paper storage unit 6, a manual paper feeding unit 7 is arranged. At a right upper part of the transfer belt 5, a fixing unit 8 is arranged to perform a fixing process on the image transferred to and formed on the recording paper P. A reference numeral 9 indicates a paper discharge unit arranged at an upper part of the casing 2 to discharge the recording paper P subjected to the fixing process in the fixing unit 8.

The image forming unit 3 includes four image forming units 10 arranged in a row along the transfer belt 5. Each of the image forming units 10 has a photosensitive drum 11. Directly under each photosensitive drum 11, a charging device 12 is arranged, and at the left side of each photosensitive drum 11, a developing device 13 is arranged. Directly above each photosensitive drum 11, a primary transfer roller 14 is arranged, and at the right side of each photosensitive drum 11, a cleaning unit 15 is arranged to clean the peripheral surface of the photosensitive drum 11.

The peripheral surface of each photosensitive drum 11 is uniformly charged by the charging device 12, and laser light corresponding to each color based on the image data inputted from the aforementioned computer and the like is irradiated to the charged peripheral surface of each photosensitive drum 11 from the optical scanning device 4, so that an electrostatic latent image is formed on the peripheral surface of each photosensitive drum 11. A developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

A reference numeral 16 indicates a secondary transfer roller arranged below the fixing unit 8 in the state of abutting the transfer belt 5, wherein the recording paper P conveyed along a paper conveyance path 17 from the paper storage unit 6 or the manual paper feeding unit 7 is interposed between the secondary transfer roller 16 and the transfer belt 5, and the toner images on the transfer belt 5 are transferred to the recording paper P by a transfer bias applied to the secondary transfer roller 16.

The fixing unit 8 includes a heating roller 18 and a pressure roller 19, wherein the recording paper P is interposed by the heating roller 18 and the pressure roller 19 so as to be pressed and heated, so that the toner images, which have been transferred to the recording paper P, are fixed to the recording paper P. The recording paper P subjected to the fixing process is discharged to the paper discharge unit 9. A reference numeral 20 indicates a reversing conveyance path for reversing the recording paper P discharged from the fixing unit 8 at the time of duplex printing.

Figure 2:
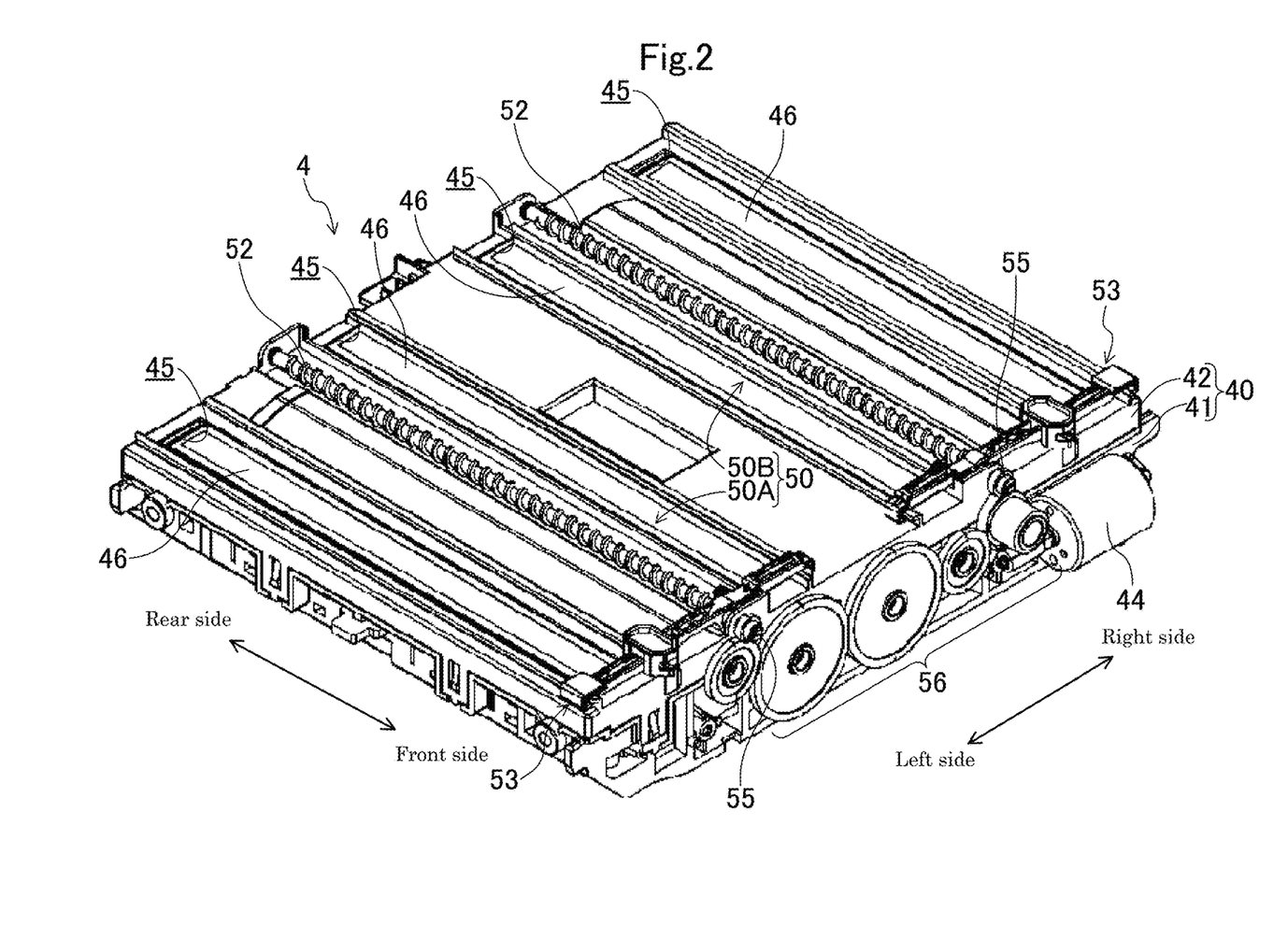
FIG. 2 is an external appearance perspective view of an optical scanning device.

FIG. 2 is an external appearance perspective view of the optical scanning device 4. The optical scanning device 4 includes a sealed box-like housing 40. The housing 40 includes a bottomed box-like housing body 41 in which a ceiling side is opened, and a lid member 42 that closes the ceiling side of the housing body 41.

Figure 3:
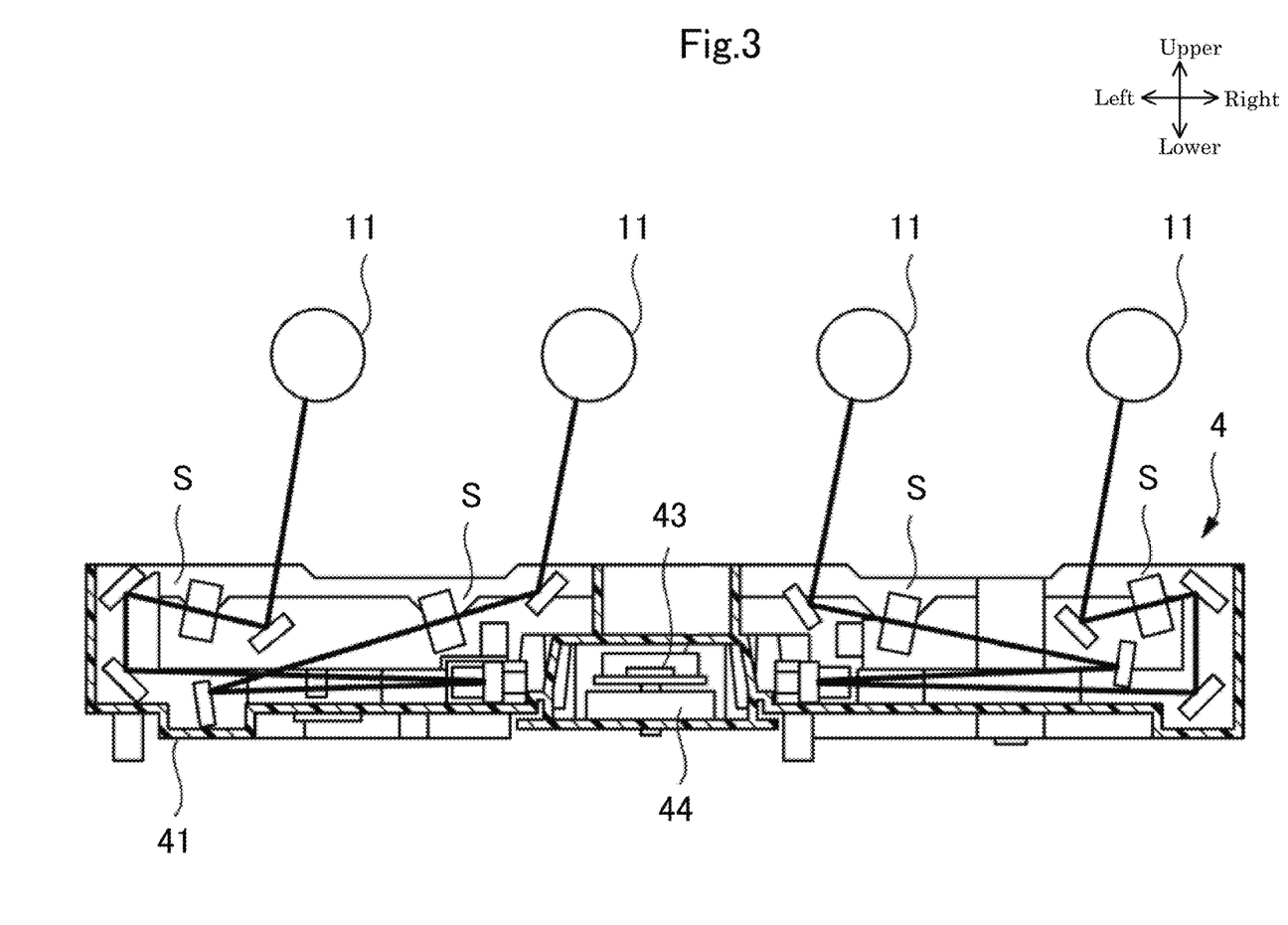
FIG. 3 is a schematic diagram illustrating an internal structure of a housing body of an optical scanning device.

FIG. 3 is a sectional view illustrating a state in which the lid member 42 has been detached from the housing 40 of the optical scanning device 4. At a center part of a bottom wall of the housing body 41, a polygon mirror 43 and a driving motor 44 for rotationally driving the polygon mirror 43 are arranged. The polygon mirror 43 deflects and scans laser light for electrostatic latent image writing, which is emitted from a light source and corresponds to each color of magenta (M), cyan (C), yellow (Y), and black (K). At the bottom wall of the housing body 41, two pairs of scanning optical systems S, that is, total four scanning optical systems S are arranged at both sides of the polygon mirror 43 while interposing the polygon mirror 43 therebetween. The four scanning optical systems S guide the laser light, which corresponds to each color of the magenta (M), the cyan (C), the yellow (Y), and the black (K), to the surface of the surface of each photosensitive drum 11. Each of the scanning optical systems S, for example, is configured by a fθ lens, a reflecting mirror and the like.

As illustrated in FIG. 2, the lid member 42 is formed with two sets of (total four) light emitting ports 45 through which the laser light emitted from the scanning optical systems S passes, wherein one set of light emitting ports 45 form a pair. Each light emitting port 45 includes a rectangular opening extending in a main scanning direction (a front and rear direction). The light emitting ports 45 are formed in parallel with one another in a right and left direction. Each light emitting port 45 is covered by a transparent cover 46 for dustproof that allows light to pass therethrough. Each transparent cover 46 covering each light emitting port 45 is formed in a rectangular plate shape long in the main scanning direction. The surface of each transparent cover 46 is automatically cleaned by an automatic cleaning mechanism 50.

The automatic cleaning mechanism 50 has a first automatic cleaning part 50A and a second automatic cleaning part 50B. The first automatic cleaning part 50A and the second automatic cleaning part 50B are symmetrically arranged while interposing a center position of the housing 40 in the longitudinal direction (the right and left direction) of the housing 40. The first automatic cleaning part 50A cleans two transparent covers 46 through which the laser light of the yellow (Y) and the black (K) passes. The second automatic cleaning part 50B cleans two transparent covers 46 through which the laser light of the magenta (M) and the cyan (C) passes. The first automatic cleaning part 50A and the second automatic cleaning part 50B are driven by one common driving motor 44.

Figure 4:
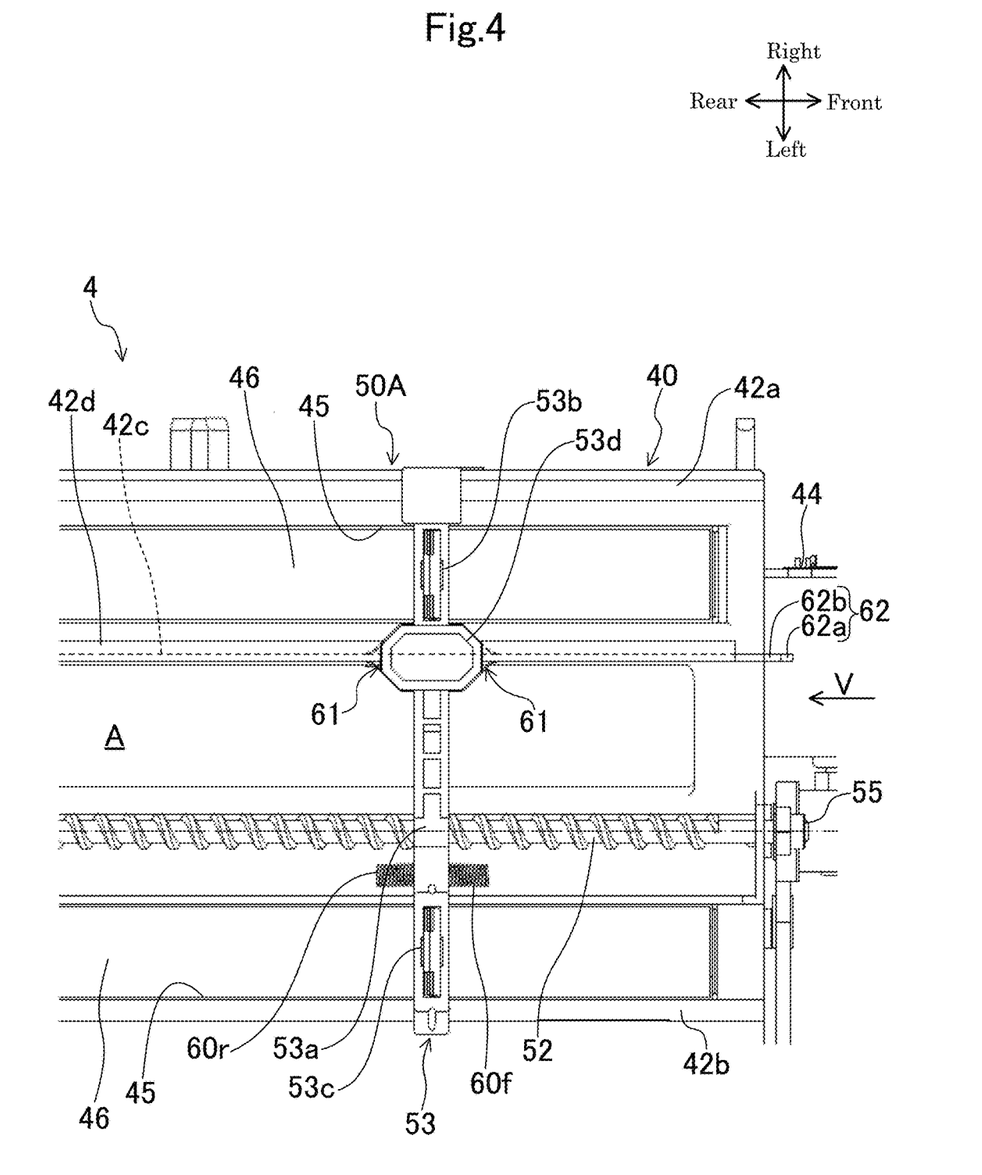
FIG. 4 is a plan view illustrating a state in which a holding member of an automatic cleaning part exists in an intermediate part of a movement path.

Since the first automatic cleaning part 50A and the second automatic cleaning part 50B have the same configuration, only the first automatic cleaning part 50A will be described below with reference to FIG. 4 and FIG. 5 and a description of the second automatic cleaning part 50B will be omitted.

The first automatic cleaning part 50A has a screw shaft 52 arranged between a pair of light emitting ports 45 to freely rotate, a holding member 53 reciprocally driven by the screw shaft 52, and a pair of cleaning members 51 (illustrated only in FIG. 5) held by the holding member 53.

The screw shaft 52 is arranged so as to extend in the front and rear direction. The screw shaft 52 is formed on the outer peripheral surface thereof with a spiral groove. Both end parts of the screw shaft 52 in an axial direction (the front and rear direction) are supported to be rotatable to a bearing part (not illustrated) provided to the lid member 42 of the housing 40. The screw shaft 52 is mounted at one end part thereof with a driving gear 55. The driving gear 55 is connected to the driving motor 44 via a gear train 56 supported to the side wall surface of the housing body 41. The driving motor 44 is mounted on the front side surface of the housing 40, and the screw shaft 52 is driven by the driving motor 44.

The holding member 53 has a nut part 53a, a first arm part 53b, a second arm part 53c, and a guide part 53d.

The nut part 53a forms an approximately cylindrical shape and is fitted to and is screwed with the screw shaft 52. Specifically, the nut part 53a is provided on the inner peripheral surface thereof with a spiral protrusion part which is screwed with a spiral groove of the outer peripheral surface of the screw shaft 52. The screw shaft 52 is arranged at a position offset to one side (the left side in the present embodiment) with respect to the center position in the longitudinal direction of the holding member 53 in the plan view.

The first arm part 53b extends rightward (one light emitting port 45 side) from an upper end part of the nut part 53a, and the second arm part 53c extends leftward (the other light emitting port 45 side) from the upper end part of the nut part 53a. The first arm part 53b and the second arm part 53c are arranged on the same straight line extending in the right and left direction when viewed from an upper side. A length from a proximal end to a distal end of the first arm part 53b is longer than that from a proximal end to a distal end of the second arm part 53c.

The first arm part 53b and the second arm part 53c are mounted at the lower surfaces thereof with the cleaning members 51, respectively. The first arm part 53b is provided at the intermediate part in the longitudinal direction thereof with the guide part 53d to be described later. The second arm part 53c is mounted at the front side surface and the rear side surface thereof with compression coil springs 60f and 60r (see FIG. 4), respectively. The compression coil springs 60f and 60r have a function of pushing back the holding member 53 and allowing the nut part 53a to be reliably engaged with the spiral groove of the screw shaft 52 when the holding member 53 has reached a moving end of a movement path A.

Each cleaning member 51 (see FIG. 5) is formed by an elastic blade member (for example, a silicon pad). The cleaning members 51 are provided at positions corresponding a pair of transparent covers 46 to be cleaned by the automatic cleaning parts 50A and 50B. That is, each cleaning member 51 is provided at a position overlapping each transparent cover 46 in the plan view. Each cleaning member 51 is interposed between the arm parts 53b and 53c and the transparent cover 46 and is compressed with a light load in a thickness direction. By so doing, each cleaning member 51 is pressed to the transparent cover 46 at a predetermined pressing force.

When the automatic cleaning mechanism 50 operates, the screw shaft 52 is rotationally driven in both forward and backward directions by the driving motor 44. By so doing, the holding member 53 reciprocally moves along the predetermined movement path A.

Next, with reference to FIG. 2 and FIG. 4 to FIG. 6, a guide structure of the holding member 53 will be described in detail. The holding member 53 is guided by a first rail part 42a, a second rail part 42b, and an intermediate rail part 42c protruding from an upper surface of the lid member 42 of the housing 40. The rail parts 42a to 42c are formed over about the whole of the lid member 42 in the front and rear direction. The rail parts 42a to 42c are integrally formed with the lid member 42

The first rail part 42a and the second rail part 42b form a sectional L shape when viewed from the movement direction of the holding member 53. The first rail part 42a guides a distal end part of the first arm part 53b of the holding member 53 to regulate its position in the up and down direction. The distal end part of the first arm part 53b forms a sectional channel shape and is engaged with a horizontal plate part of the first rail part 42a. The second rail part 42b guides a distal end part of the second arm part 53c of the holding member 53 to regulate its position in the up and down direction. The distal end part of the second arm part 53c forms a sectional channel shape and is engaged with a horizontal plate part of the second rail part 42b.

The intermediate rail part 42c is provided between the first rail part 42a and the second rail part 42b. The intermediate rail part 42c is a plate-like part vertically installed on the upper surface of the lid member 42. The intermediate rail part 42c is engaged with a guide groove 53e (see FIG. 6) of the guide part 53d provided to the holding member 53, and regulates its position in the right and left direction. A horizontal plate-like regulating part 42d is connected to an upper end part of the intermediate rail part 42c. The regulating part 42d is provided over the whole of the intermediate rail part 42c in the longitudinal direction, and regulates upward movement of the guide part 53d.

As illustrated in FIG. 7 to FIG. 10, the guide part 53d forms a hexagonal columnar shape long in the movement direction (that is, the front and rear direction) of the holding member 53. A length in the front and rear direction of the guide part 53d is longer than that in the front and rear direction of the first arm part 53b and the second arm part 53c. The guide groove 53e is formed over the whole of the guide part 53d in the front and rear direction. An upper end of the guide groove 53e communicates with a hollow part 53f (see FIG. 6) passing through the guide part 53d in the front and rear direction. The hollow part 53f is a flat rectangular columnar space. The regulating part 42d of the intermediate rail part 42c abuts a lower surface of the hollow part 53f, so that the upward movement of the guide part 53d is regulated. Both end parts in the front and rear direction of the guide part 53d are formed by a vertical surface 53g (see FIG. 8 and FIG. 10) vertical to the movement direction of the holding member 53 and a pair of inclined surfaces 53h positioned at both right and left sides while interposing the vertical surface 53g therebetween. The guide part 53d is mounted at both end parts in the front and rear direction thereof with scraper members 61 for preventing foreign matters from infiltrating into the guide groove 53e.

Figure 7:
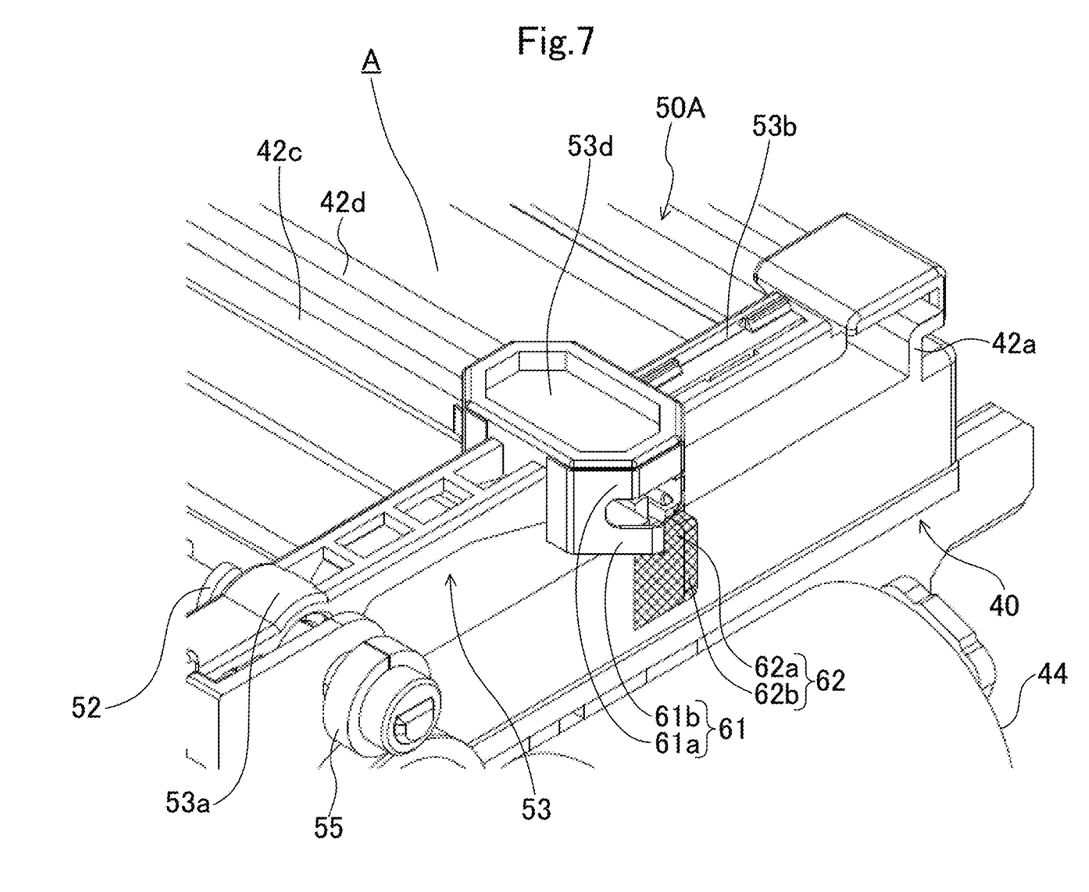
FIG. 7 is an enlarged perspective view illustrating an automatic cleaning part of an optical scanning device.

As illustrated in FIG. 7, the scraper member 61 has a pair of scraper pieces 61a that scrape off foreign matters (toner and the like) attached to a side surface of the intermediate rail part 42c, and a connection piece 61b that connects the pair of scraper pieces 61a to each other. The scraper member 61 includes a flexible member such as a PET film and rubber.

Figure 8:
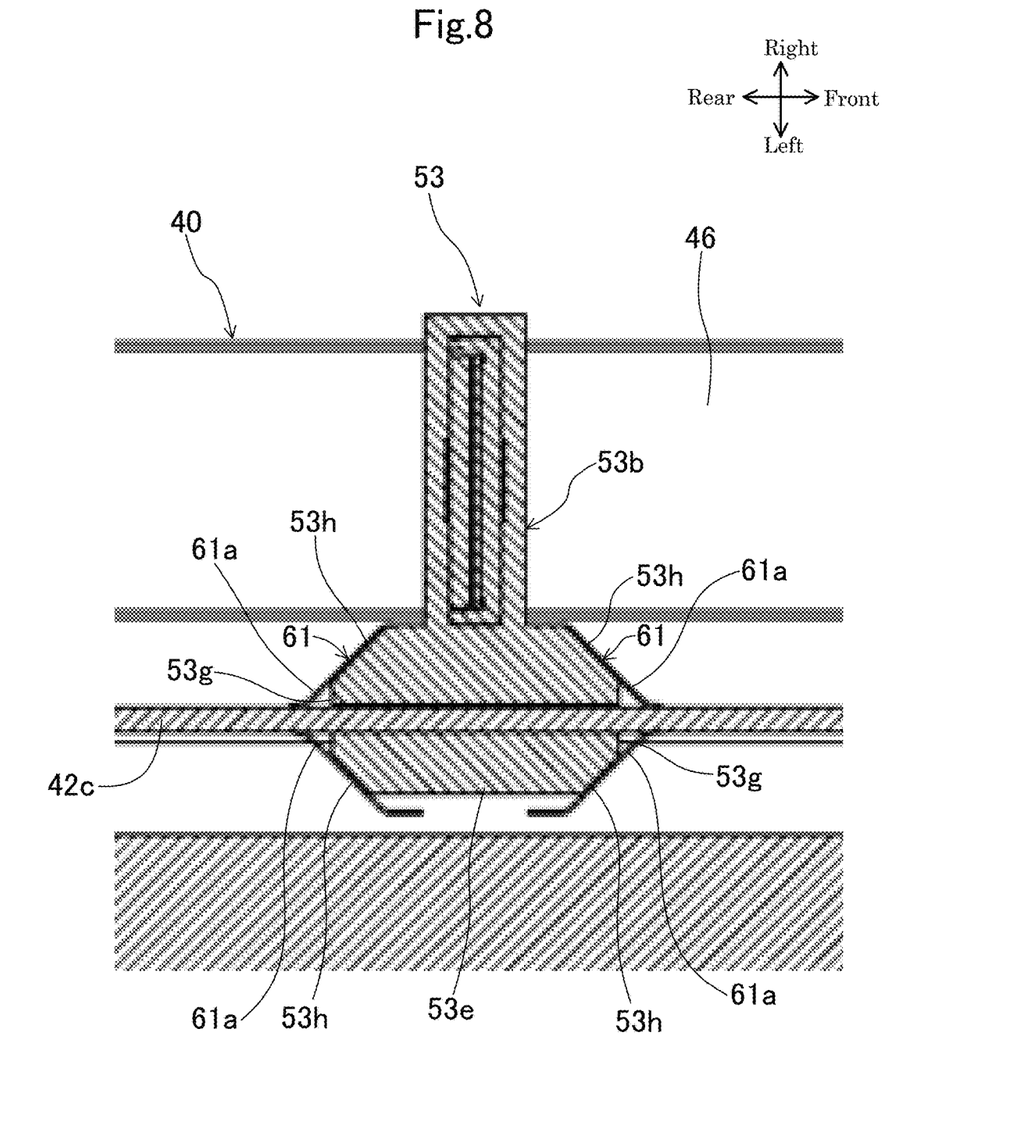
FIG. 8 is a sectional view taken along line VIII-VIII of FIG. 5.
Figure 9:
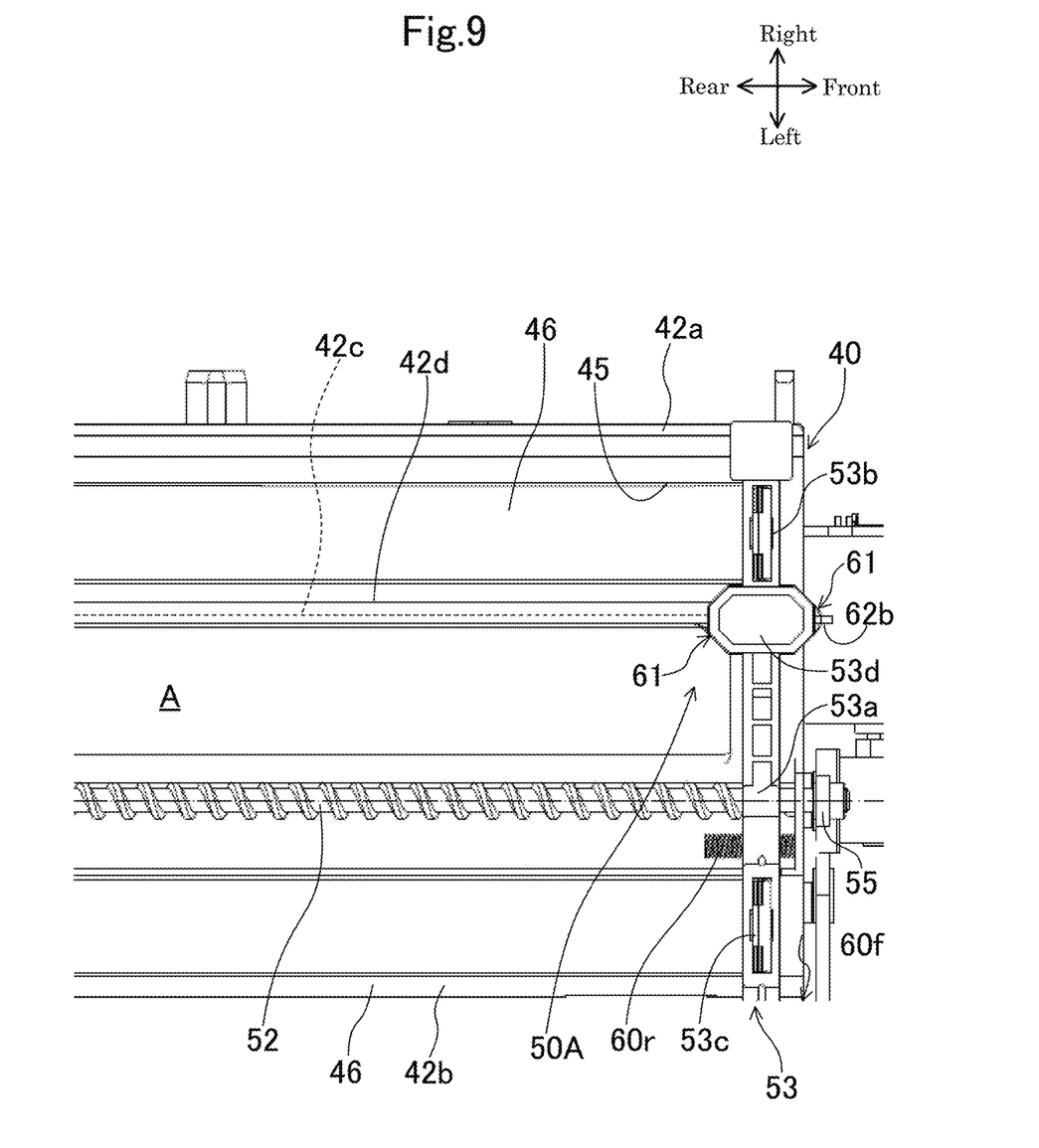
FIG. 9 is a plan view illustrating a state in which a holding member of an automatic cleaning part has reached a moving end of a movement path.

As illustrated in FIG. 8, the pair of scraper pieces 61a are provided at both sides of the intermediate rail part 42c while interposing the intermediate rail part 42c therebetween. Each of the scraper pieces 61a forms a rectangular belt shape in which its distal end edge abuts the side surface of the intermediate rail part 42c. In the plan view, each of the scraper pieces 61a is inclined with respect to the side surface of the intermediate rail part 42c and abuts the side surface of the intermediate rail part 42c. Specifically, the scraper piece 61a of one of the two scraper members 61, which is positioned at the front side of a progress direction, is configured to be inclined with respect to the side surface of the intermediate rail part 42c at a predetermined angle in the plan view, so that a distal end edge of the scraper piece 61a is positioned at the front side in the progress direction from a rear end edge of the scraper piece 61a. Each of the scraper pieces 61a is adhered and fixed to each inclined surface 53h of the guide part 53d. An inclination angle of the inclined surface 53h coincides with that of the scraper piece 61a with respect to the side surface of the intermediate rail part 42c.

Figure 5:
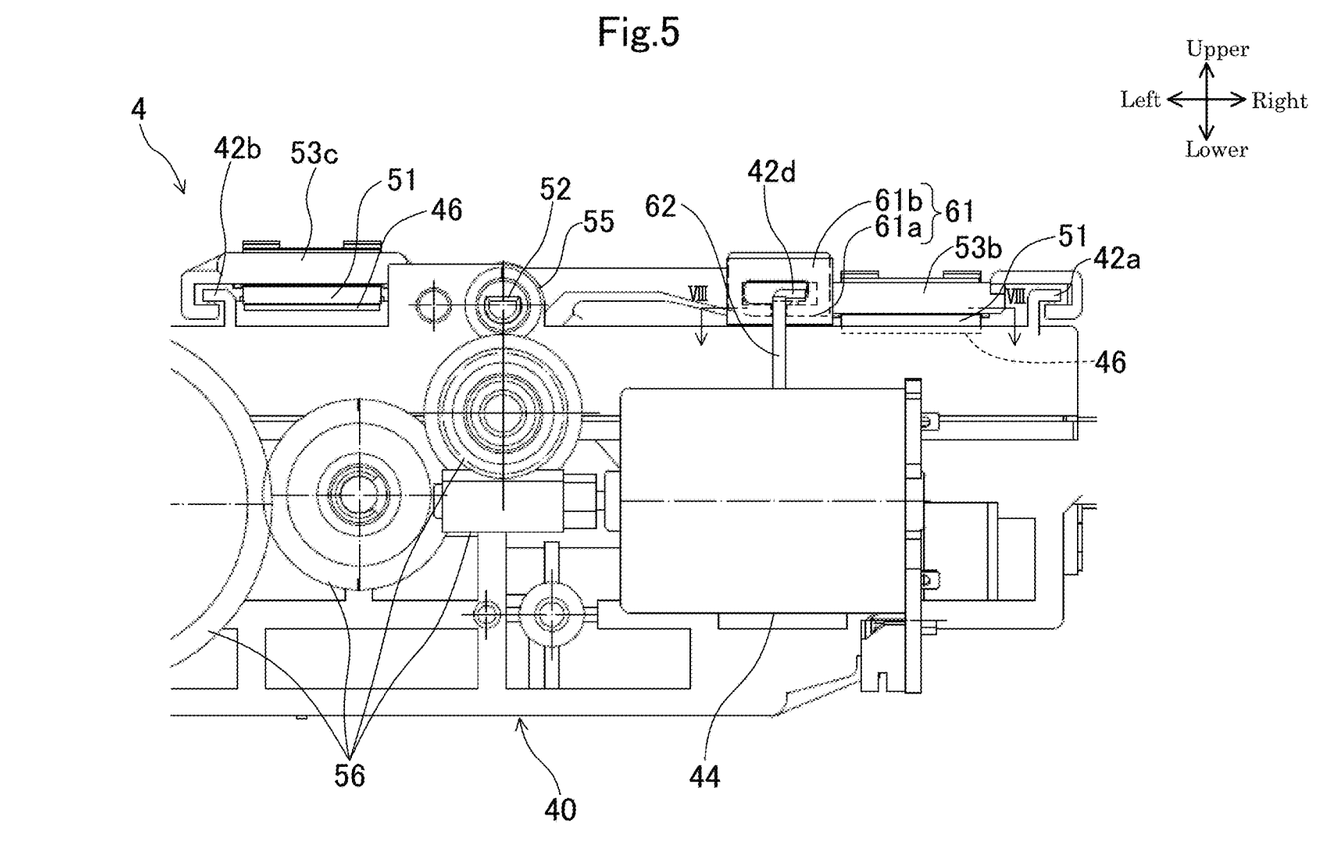
FIG. 5 is a view viewed in the arrow direction of V of FIG. 4.
Figure 6:
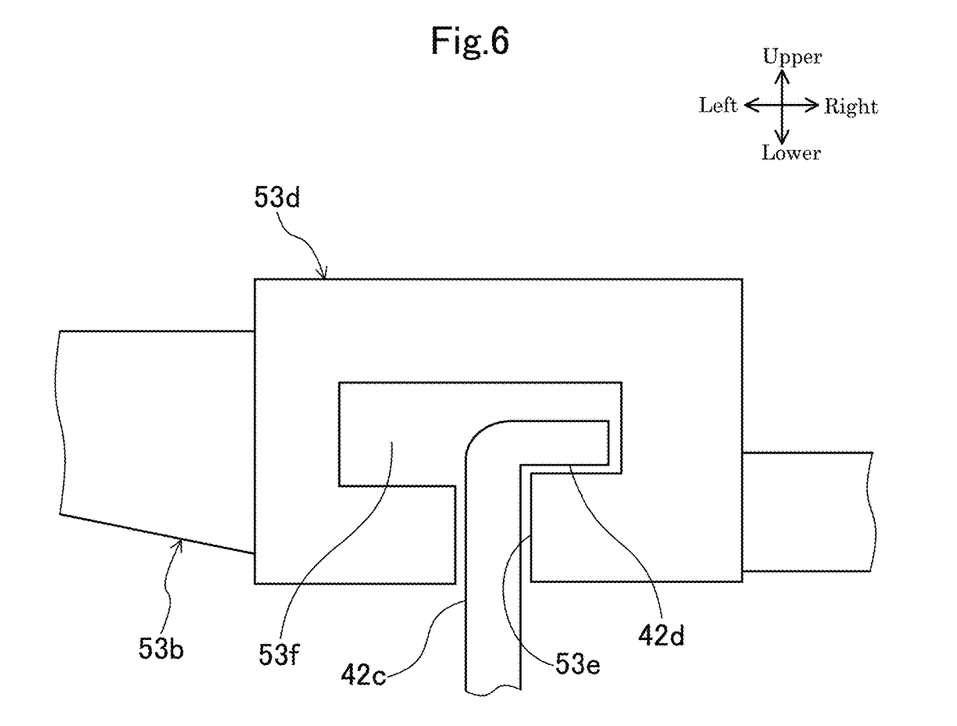
FIG. 6 is a schematic diagram illustrating a state in which an intermediate rail part is engaged with a guide part of a holding member.

The connection piece 61b forms a channel shape opened downward when viewed from the front and rear direction (see FIG. 5). The pair of scraper pieces 61a are concatenated to a lower end part of the connection piece 61b. The connection piece 61b is adhered and fixed to the vertical surface 53g and the pair of inclined surfaces 53h of the guide part 53d across the vertical surface 53g and the inclined surfaces 53h (see FIG. 10).

As illustrated in FIG. 7 and FIG. 9 to FIG. 11, the lid member 42 is provided on both side surfaces in the front and rear direction thereof with a removing plate 62 for removing foreign matters accumulated on the distal end edge of the scraper piece 61a. Each diagram illustrates only the removing plate 62 provided on the front side surface of the lid member 42; however, a similar removing plate 62 is also provided on a rear side surface of the lid member 42.

The removing plate 62 is arranged on the same straight line as that of the intermediate rail part 42c in the plan view. The removing plate 62 has a rectangular plate-like entering plate part 62a (an entering part) that enters between the distal end edges of the pair of scraper pieces 61a when the holding member 53 has reached the moving end of the predetermined movement path A, and a support plate part 62b that supports the entering plate part 62a. Between the entering plate part 62a and the intermediate rail part 42c, a space is provided (see FIG. 11). The entering plate part 62a and the intermediate rail part 42c have the same thickness. The thickness of the entering plate part 62a is slightly larger than an interval of the distal end edges of both scraper pieces 61a when the pair of scraper pieces 61a are in a natural state without deflection.

Figure 10:
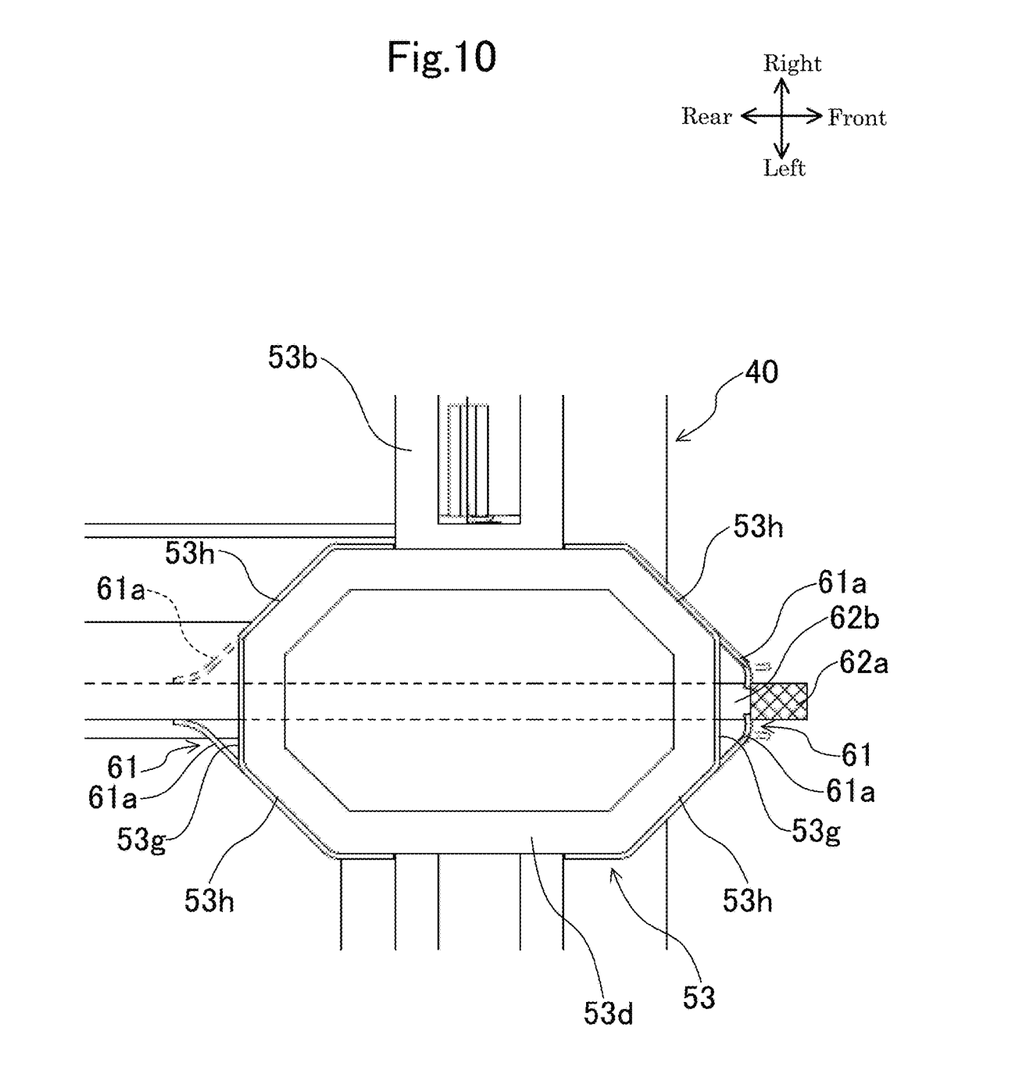
FIG. 10 is an explanation diagram for explaining an aspect in which foreign matters are removed by a removing plate when a holding member has reached a moving end of a movement path.
Figure 11:
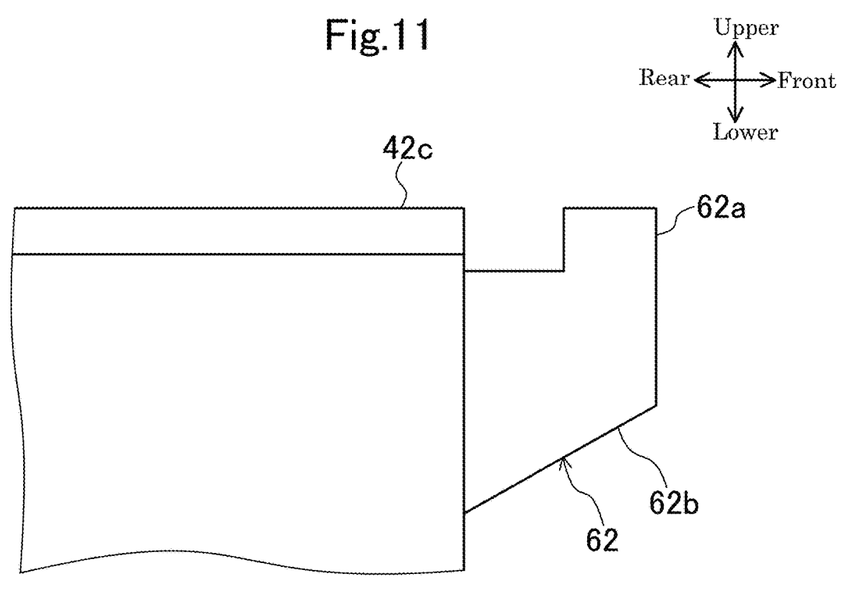
FIG. 11 is an enlarged side view illustrating a removing plate.

When the holding member 53 reaches the moving end of the movement path A, the entering plate part 62a of the removing plate 62 abuts the distal end edges of the pair of scraper pieces 61a and is pressed to the guide part 53d side as illustrated in FIG. 10. In this way, the distal end parts of the pair of scraper pieces 61a are temporarily curved and bent to the guide part 53d side, but the holding member 53 further advances to the moving end side and thus the entering plate part 62a enters between the distal end edges of the pair of scraper pieces 61a. In this case, the scraper pieces 61a are elastically returned to a side opposite to the guide part 53d side by elastic restoring force. By this returning operation, foreign matters accumulated on the distal end edges of the scraper pieces 61a are flicked away and are removed.

As described above, according to the optical scanning device 4 of the present embodiment, when the holding member 53 reciprocally moves along the predetermined movement path A by the rotation of the screw shaft 52, foreign matters (toner and the like) attached to both side surfaces of the intermediate rail part 42c are scraped off by the scraper pieces 61a of the scraper member 61 mounted at the holding member 53. Consequently, the foreign matters attached to both side surfaces of the intermediate rail part 42c can be prevented from entering into the guide groove 53e of the guide part 53d and being caught therein.

Furthermore, the scraper members 61 are mounted at both end parts of the guide part 53d in the movement direction of the holding member 53, wherein the scraper members 61 are arranged such that the scraper piece 61a of the scraper member 61, which is positioned at the front side of the progress direction at the time of the reciprocal movement of the holding member 53, is inclined with its distal end side being further in the front side than its base end side of the progress direction in the plan view.

According to this, the scraper piece 61a of the scraper member 61, which is positioned at the front side of the progress direction at the time of the reciprocal movement of the holding member 53, can be allowed to abut the side surface of the intermediate rail part 42c at an acute angle. Thus, foreign matters attached to the side surface of the intermediate rail part 42c can be efficiently scraped off by the scraper piece 61a.

Furthermore, the intermediate rail part 42c is provided at the outer side of both side end parts of thereof, in the movement direction of the holding member 53 with the entering plate part 62a that enters between the distal end edges of the pair of scraper pieces 61a when the holding member 53 reaches the moving end of the predetermined movement path A. When entering between the distal end edges of the pair of scraper pieces 61a, the entering plate part 62a is configured to press and bend the distal end parts of the scraper pieces 61a to the guide part 53d side and then to allow the distal end parts to be elastically returned to an opposite side of the guide part 53d side by elastic restoring force.

According to this, when the distal end parts of the scraper pieces 61a are elastically returned to the opposite side of the guide part 53d side, foreign matters are flicked away and are removed. Consequently, foreign matters accumulated on the distal end edges of the scraper pieces 61a can be prevented from being enlarged to enter to the guide part 53d side.

Furthermore, each of both side end parts of the guide part 53d in the movement direction of the holding member 53 has the vertical surface 53g formed to be vertical to the movement direction of the holding member 53 in the plan view and the pair of inclined surfaces 53h which are connected to both side end edges of the vertical surface 53g in a direction perpendicular to the movement direction and are inclined at the same angle as those of the pair of scraper pieces 61a in the plan view, wherein the scraper pieces 61a are fixed to the inclined surfaces 53h.

According to the configuration, the scraper pieces 61a are fixed to the pair of inclined surfaces 53h, so that the inclination angle of the scraper pieces 61a is adjusted to a predetermined angle and thus their distal end edges can be allowed to abut the side surface of the intermediate rail part 42c at an acute angle.

Furthermore, when viewed from the movement direction of the holding member 53, the scraper member 61 has the connection piece 61b that connects the base end parts of the pair of scraper pieces 61a to each other, wherein the connection piece 61b is fixed to the vertical surface 53g and the pair of inclined surfaces 53h across the surfaces 53h and 53g at both side end parts of the guide part 53d.

According to the configuration, an area of a part, in which the scraper member 61 and the holding member 53 abut each other, is increased as much as possible, so that the scraper member 61 can be firmly fixed to the holding member 53.

Furthermore, the length of the guide part 53d in the movement direction of the holding member 53 is longer than those of the arm parts 53b and 53c in the movement direction.

According to this, it is possible to sufficiently ensure the length of the guide groove 53e formed in the guide part 53d. Thus, it is possible to improve guide characteristics due to the guide part 53d (the guide groove 53e). Accordingly, the holding member 53 is prevented from being tilted or caused to wiggle to a small degree during movement, so that it is possible to prevent the occurrence of wiping unevenness of the transparent cover 46 due to the cleaning member 51.

Furthermore, in the optical scanning device 4 of the present embodiment, the light emitting ports 45 are provided as a pair of one set, wherein a pair of light emitting ports 45 are arranged in parallel to each other. The holding member 53 includes the nut part 53*a* fitted to and screwed with the screw shaft 52, the first arm part 53*b* extending from the nut part 53*a* to one light emitting port 45 side so as to hold the cleaning member 51, and the second arm part 53*c* extending from the nut part 53*a* to the other light emitting port 45 side so as to hold the cleaning member 51. The screw shaft 52 is arranged at a position offset to the center position in the longitudinal direction of the holding member 53 in the plan view.

In such an optical scanning device 4, since the screw shaft 52 is arranged at the position offset to the center position in the longitudinal direction of the holding member 53, when the screw shaft 52 rotates and the holding member 53 moves, balance between driving force acting on the holding member 53 by the screw shaft 52 and frictional force acting on the holding member 53 from the surface of the transparent cover 46 via the cleaning member 51 is collapsed and thus the holding member 53 is easily caused to wiggle to a small degree or is easily tilted. Thus, the configuration of the present disclosure, in which the guide part 53*d* is provided to the holding member 53, is particularly useful. In this case, employing the scraper member 61 of the present disclosure is particularly useful to prevent foreign matters from being caught during the movement of the holding member 53 (the guide part 53*d*).

Other Embodiments

The aforementioned embodiment has described a case where a pair of light emitting ports 45 are formed in the housing 40; however, one light emitting port 45 may be formed in the housing 40.

In the aforementioned embodiment, the scraper member 61 is configured with a flexible member; however, the technology of the present disclosure is not limited thereto and the scraper member 61 may be configured with a member having no flexibility such as a fabric and a felt.

What is claimed is:

1. An optical scanning device including a housing having light emitting ports, a transparent cover closing the light emitting ports, a freely rotatable screw shaft extending along the transparent cover, a cleaning member abutting a surface of the transparent cover, and a holding member having a nut part screwed with the screw shaft and arm parts extending from the nut part to hold the cleaning member, the holding member being configured to reciprocally move along a predetermined movement path by rotation of the screw shaft, wherein from an upper surface of the housing, a plate-like rail part, which extends along the screw shaft to guide movement of the holding member, protrudes,
the holding member is provided with a guide part having a guide groove engaged with the rail part, and
the optical scanning device further comprises:
a scraper member fixed to the holding member and scraping off a foreign matter attached to the rail part, wherein the scraper member includes a pair of scraper pieces provided at both sides of the rail part while interposing the rail part therebetween and having distal end edges abutting a side surface of the rail part.

2. The optical scanning device of claim 1, wherein the scraper member is mounted at both side end parts of the guide part in a movement direction of the holding member, and
two of the scraper members are arranged such that the scraper piece of the scraper member, which is positioned at a front side of a progress direction at a time of reciprocal movement of the holding member, is inclined with a distal end side of the scraper piece being further in the front side of the progress direction than a base end side of the scraper piece in a plan view.

3. The optical scanning device of claim 2, wherein each of both side end parts of the guide part in a movement direction of the holding member has a vertical surface formed to be vertical to the movement direction of the holding member in the plan view and a pair of inclined surfaces which are connected to both side end edges of the vertical surface in a direction perpendicular to the movement direction and are inclined at an angle equal to angles of the pair of scraper pieces in the plan view, the scraper piece being fixed to the inclined surfaces.

4. The optical scanning device of claim 3, wherein the scraper member has a connection piece that connects base end parts of the pair of scraper pieces to each other when viewed from the movement direction of the holding member, and
the connection piece is fixed to the pair of inclined surfaces and the vertical surface across the pair of inclined surfaces and the vertical surface at both side end parts of the guide part.

5. The optical scanning device of claim 1,
wherein the scraper piece includes a flexible member, and
the rail part is provided at an outer side of both side end parts thereof, in a movement direction of the holding member with an entering part entering between distal end edges of the pair of scraper pieces when the holding member reaches a moving end of the predetermined movement path, and
when entering between the distal end edges of the pair of scraper pieces, the entering part is configured to press and bend distal end parts of the scraper pieces to a side of the guide part and to allow the distal end parts to be elastically returned to a side opposite to the side of the guide part by elastic restoring force.

6. The optical scanning device of claim 1, wherein a length of the guide part in a movement direction of the holding member is longer than a length of the arm parts in the movement direction.

7. The optical scanning device of claim 1, wherein the light emitting ports are provided as a pair of one set, the pair of light emitting ports being arranged in parallel to each other,
two arm parts are provided to the holding member, one arm part extending from the nut part to a side of one light emitting port so as to hold the cleaning member, the other arm part extending from the nut part to a side of the other light emitting port so as to hold the cleaning member, and
the screw shaft is arranged at a position offset to a center position in a longitudinal direction of the holding member in the plan view.

8. An image forming apparatus including the optical scanning device of claim 1.

* * * * *

Disclaimer and Dedication

10,367,964 B2 — Simon Dodd, West Linn, OR (US); Ivan Ellul, Zurrieq (MT); Christopher Brincat, Swieqi (MT). MICROFLUIDIC ASSEMBLY AND METHODS OF FORMING SAME. Patent dated July 23, 2019. Disclaimer filed October 15, 2019 by the assignee, STMicroelectronics, Inc.

Hereby disclaim and dedicate to the public, complete claims 1-17 of said patent.

*(Official Gazette, February 25, 2020)*